US011978991B2

(12) United States Patent
De Pasquale et al.

(10) Patent No.: US 11,978,991 B2
(45) Date of Patent: May 7, 2024

(54) INSULATION DISPLACEMENT CONNECTOR WITH MODULAR STRUCTURE FOR FAST IDC CONNECTION

(71) Applicants: TE Connectivity Italia Distribution S.r.l., Turin (IT); TE Connectivity Germany GmbH, Bensheim (DE)

(72) Inventors: Fabio De Pasquale, Turin (IT); Thomas Klenner, Bensheim (DE)

(73) Assignees: TE Connectivity Germany GmbH, Bensheim (DE); TE Connectivity Italia Distribution S.r.l., Turin (IT)

( * ) Notice: Subject to any disclaimer, the term of this patent is extended or adjusted under 35 U.S.C. 154(b) by 0 days.

(21) Appl. No.: 17/870,959

(22) Filed: Jul. 22, 2022

(65) Prior Publication Data

US 2023/0024862 A1 Jan. 26, 2023

(30) Foreign Application Priority Data

Jul. 23, 2021 (EP) ..................................... 21187412

(51) Int. Cl.

*H01R 4/2454* (2018.01)
*H01R 4/18* (2006.01)
*H01R 43/01* (2006.01)

(52) U.S. Cl.

CPC ............. *H01R 4/2454* (2013.01); *H01R 4/18* (2013.01); *H01R 43/01* (2013.01)

(58) Field of Classification Search

CPC ........ H01R 4/2454; H01R 4/18; H01R 43/01; H01R 4/2433; H01R 4/2452; H01R 4/2495; H01R 13/506; H01R 13/514
See application file for complete search history.

(56) References Cited

U.S. PATENT DOCUMENTS

| | | | | |
|---|---|---|---|---|
| 4,130,331 A | | 12/1978 | Neff et al. | |
| 4,758,178 A | | 7/1988 | Heimbrock | |
| 5,697,806 A | * | 12/1997 | Whiteman, Jr. | H01R 31/00 439/417 |
| 5,782,652 A | * | 7/1998 | Feher | H02K 11/40 439/417 |
| 6,461,201 B1 | | 10/2002 | Maeda et al. | |

(Continued)

FOREIGN PATENT DOCUMENTS

| | | |
|---|---|---|
| DE | 19814401 B4 | 4/2008 |
| EP | 0821439 B1 | 1/1998 |

(Continued)

OTHER PUBLICATIONS

Extended European Search Report dated Jan. 10, 2022, Application No. 21187412.8-1201, 44 pages.

(Continued)

*Primary Examiner* — Jean F Duverne
(74) *Attorney, Agent, or Firm* — Barley Snyder

(57) ABSTRACT

An insulation displacement contact (IDC) cluster includes a plurality of IDC cluster modular units each having a plurality of receptacles adjacent to one another in a row. Each of the receptacles receives an IDC terminal. A first IDC cluster modular unit of the IDC cluster modular units is coupled to a second IDC cluster modular unit of the IDC cluster modular units to form a modular structure by stacking and fastening together, arranging the receptacles of the IDC cluster modular units in parallel rows.

19 Claims, 9 Drawing Sheets

(56) References Cited

U.S. PATENT DOCUMENTS

| | | | |
|---|---|---|---|
| 8,753,141 | B2 | 6/2014 | Randolph |
| 2006/0116028 | A1 | 6/2006 | Boischio |
| 2007/0012891 | A1 | 1/2007 | Maltezos et al. |
| 2007/0128919 | A1 | 6/2007 | Demuth et al. |
| 2014/0001535 | A1 | 1/2014 | Purayath et al. |
| 2014/0015357 | A1 | 1/2014 | Randolph et al. |
| 2021/0012638 | A1 | 1/2021 | Jalilian et al. |
| 2021/0126382 | A1 | 4/2021 | Randolph et al. |

FOREIGN PATENT DOCUMENTS

| | | | |
|---|---|---|---|
| JP | 2148565 | U | 12/1990 |
| JP | 2000286005 | A | 10/2000 |
| JP | 2000348809 | A | 12/2000 |
| JP | 3174276 | B2 * | 6/2001 |
| JP | 200331055 | A | 1/2003 |
| JP | 3174276 | B2 | 3/2012 |
| KR | 102048544 | B1 | 11/2019 |

OTHER PUBLICATIONS

Japanese Notice of Reasons for Refusal dated Aug. 22, 2023, with English translation, corresponding to Application No. 2022-115209, 10 pages.

* cited by examiner

INSULATION DISPLACEMENT CONNECTOR WITH MODULAR STRUCTURE FOR FAST IDC CONNECTION

CROSS-REFERENCE TO RELATED APPLICATIONS

This application claims the benefit of the filing date under 35 U.S.C. § 119(a)-(d) of European Patent Application No. 21187412.8, filed on Jul. 23, 2021.

FIELD OF THE INVENTION

The present invention relates to a connector and, more particularly, to a connector having an insulation displacement connection.

BACKGROUND

Insulation displacement contact (IDC) terminals that are used for contacting an electrically insulated wire are well known. When the electrically insulated wire is inserted into the contact slot of the IDC terminal, the electrical insulation of the wire is cut open by edges of the contact slot such that electrical contact is established between the electrically insulated wire and the electrical contact terminal. In order to ensure good electrical contact, the contact slot needs to have a width smaller than a diameter of the electrically insulated wire after the insulation is removed. The electrical insulation can thereby be cut open when the electrically insulated wire is inserted into the contact slot and direct contact between the electrical contact terminal and the electrically insulated wire can be ensured. An example of an IDC terminal with expanded wire range capacity is disclosed in US 2021/0126382. Another example of an IDC terminal and a connector arrangement consisting of the IDC terminal and a housing are known from US 2007/0128919.

There are many applications where it is desired to terminate a wire by IDC connection in preparation for making an electrical connection to another wire. Such a need for IDC connection is characteristic of magnet wires, particularly magnet wires wound upon a bobbin or a core of a motor. For example, TE Connectivity manufactures an IDC terminal known as MAG-MATE, which has a contact slot for contacting an electrically insulated conductor and a contact opening for magnet wires.

An example of an electrical connector assembly which easily and efficiently connects harnesses to magnet wires and which allows for ease in repair and replacement is disclosed in US 2014/0015357. Moreover, patent U.S. Pat. No. 4,130,331 describes a connector mounted upon the same support as a coil and to which the end of the coil wire can be easily connected electrically and mechanically, without the aid of solder and by automated means.

Given the widespread use of magnet wires and electrically insulated wires, there is a constant need to speed up and simplify the assembly process of the wires with the corresponding IDC connectors.

SUMMARY

An insulation displacement contact (IDC) cluster includes a plurality of IDC cluster modular units each having a plurality of receptacles adjacent to one another in a row. Each of the receptacles receives an IDC terminal. A first IDC cluster modular unit of the IDC cluster modular units is coupled to a second IDC cluster modular unit of the IDC cluster modular units to form a modular structure by stacking and fastening together, arranging the receptacles of the IDC cluster modular units in parallel rows.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
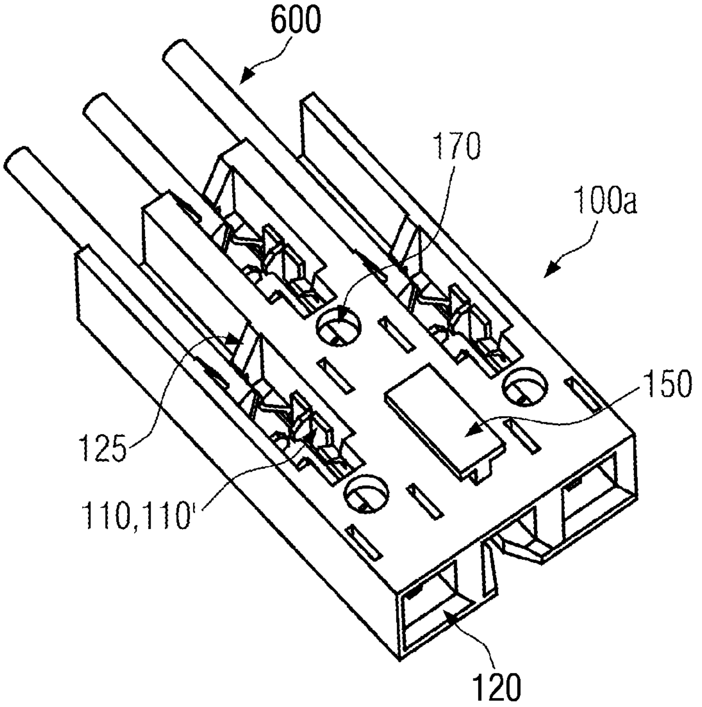
FIG. 1 is a perspective view of an IDC cluster modular unit according to an embodiment.

In the following, the present invention is described with reference to particular embodiments as shown in the enclosed drawings. Nevertheless, the present invention is not limited to the particular embodiments described in the following detailed description and shown in the figures, but, instead, the embodiments described simply exemplify several aspects of the present invention, the scope of which is defined by the appended claims.

Further modifications and variations of the present invention will be clear for the person skilled in the art. Therefore, the present description must be considered as including all the modifications and/or variations of the present invention, the scope of which is defined by the appended claims.

For simplicity, identical or corresponding components are indicated in the figures with the same reference numbers.

In the description of embodiments of the invention disclosed herein, any reference to direction or orientation is merely intended for convenience of description and is not intended in any way to limit the scope of the present invention. Relative terms such as “lower”, “upper”, “horizontal”, “vertical”, “above”, “below”, “up”, “down”, “top” and “bottom” as well as derivative thereof should be construed to refer to the orientation as then described or as shown in the drawing under discussion. These relative terms are for convenience of description only and do not require that the apparatus be constructed or operated in a particular orientation, unless explicitly indicated as such.

FIG. 1 schematically illustrates the structure of a single IDC cluster modular unit 100*a*, according to an embodiment of the present invention. The IDC cluster modular unit 100*a* comprises a box-shaped structure and defines an accommodating portion comprising three inlet receptacles 120 for receiving three corresponding electrical terminals 110, 110'. The three inlet receptacles 120 may be arranged offset from each other, as shown in FIG. 1. The electrical terminals 110, 110' comprise IDC terminals, which can terminate insulated wires 600 by insulation displacement connection.

Each inlet receptacle 120 has a holding device 125 for keeping the electrical wire 600 in its connection position within the IDC terminal 110, 110' and preventing it from moving within the inlet receptacle 120 during the life-time of the electrical connector.

It is clear that, even if three electrical terminals 110, 110' and three inlet receptacles 120 are illustrated in the embodiment of FIG. 1, any number of electrical terminals 110, 110' and inlet receptacles 120 may be provided, for instance one, two, four, five or more.

Figure 2:
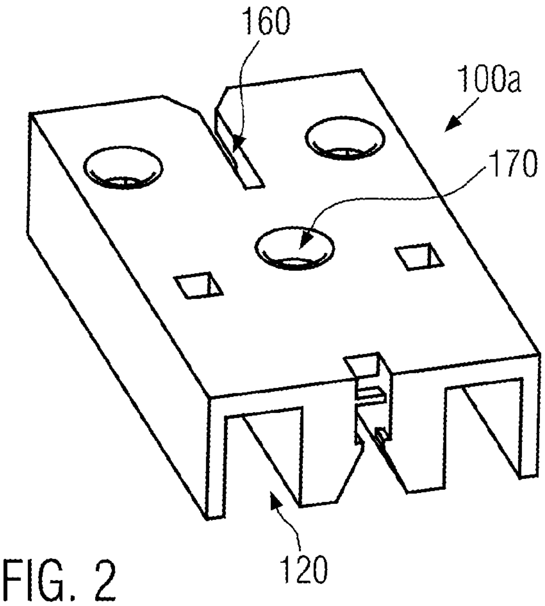
FIG. 2 is another perspective view of the IDC cluster modular unit.

The IDC cluster modular unit 100*a* comprises a box-shaped structure having a first surface and a second surface. The first surface comprises hooking elements 150 (see the top surface of the IDC cluster modular unit 100*a* in FIG. 1); the second surface comprises a fixing portion 160 (see FIG. 2, showing the IDC cluster modular unit 100*a* in a flipped configuration with respect to FIG. 1). The hooking elements 150 of a first IDC cluster modular unit may be simply fixed to the fixing portion 160 of a second IDC cluster modular unit in order to fasten the two IDC cluster modular units together. A plurality of IDC cluster modular units 100*a*, 100*b*, 100*c* may hence be stacked and fastened to one another to form a piled, modular structure, like the one represented in FIG. 5. The assembly process is then fast and efficient and simple.

As shown in FIG. 2, the second surface of the IDC cluster modular unit 100*a* further comprises three plug inlets 170 (one for each IDC terminal 110, 110') to connect the IDC cluster modular unit 100*a* to an input plug for a compressor. However, it is clear that any number of plug inlets 170 may be formed on the IDC cluster modular unit 100*a*, for instance one, two, four or more.

Figure 3:
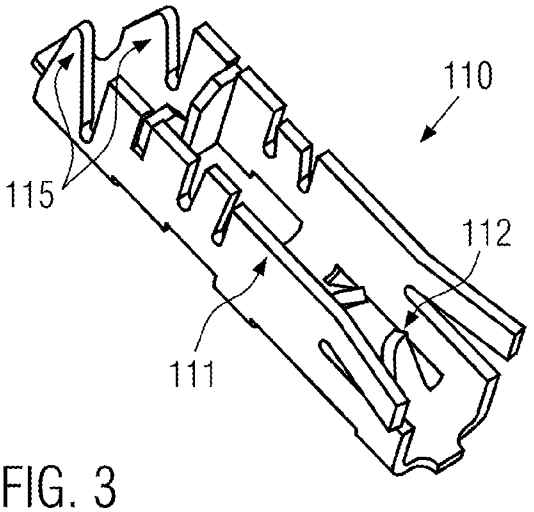
FIG. 3 is a perspective view of an electrical terminal of the IDC cluster modular unit.
Figure 4:
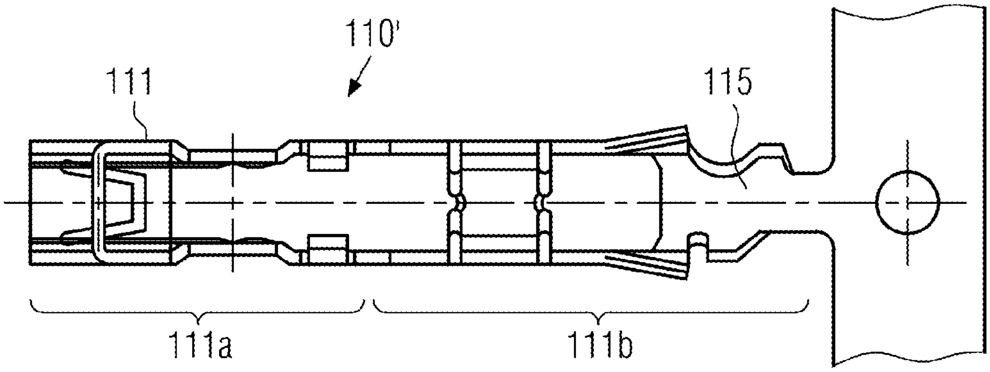
FIG. 4 is a top view of the electrical terminal.

Exemplifying configurations of IDC terminals 110, 110' that can be housed in the IDC cluster modular unit 100*a* are illustrated in FIGS. 3 and 4.

The IDC terminal 110 of FIG. 3 comprises a metal semi-tubular portion 111 for accommodating an electrical wire 600 having an insulation case. The semi-tubular portion 111 comprises piercing elements 112 for removing the insulation case from the electrical wire 600. An IDC tool may be used to pull the electrical wire 600 accommodated into the semi-tubular portion 111, to move it against the piercing elements 112 and thus displace the insulation case.

In the embodiment shown in FIG. 3, the IDC terminal 110 further comprises wire-retention flaps 115 that are positioned at one end of the semi-tubular portion 111. The wire-retention flaps 115 may be compressed tightly around the insulation case of the electrical wire 600 and may act as a primary holding-down device for keeping the electrical wire 600 in its connection position within the IDC terminal 110, once the insulation case has been removed and the connection between the conductive part of the wire and the terminal 110 has been established (see also FIG. 1 showing the wire-retention flaps 115 in the retaining configuration). The wire-retention flaps 115 may be formed on two opposite sides of the IDC terminal 110 and they may be configured so that they can be pressed onto the electrical wire 600 to encapsulate it and maintain it in the correct position. The wire-retention flaps 115 may thus be configured as an insulation crimp device to avoid that the wire 600 can be removed from the IDC terminals 110.

The wire-retention flaps 115 may hence be configured as an insulation crimp holding-down device. This configuration is advantageous because a connector might be subjected to mechanical vibrations, during its lifetime, and the primary holding-down device 115 ensures that the electrical wire 600 is mounted into the correct connection position within the IDC terminal and that it is not displaced during usage of the connector.

The IDC terminal 110' of FIG. 4 comprises a metal semi-tubular portion 111 including two portions 111*a* and 111*b*: the first metal portion 111*a* comprises a first contact area for contacting an electrical pin and the second metal portion 111*b* comprises a conductor fastening area for accommodating an electrical wire 600 and terminating it by IDC connection. The structure of the IDC terminal 110' according to an embodiment of the present invention is described in more detail for example in document DE 198 14 401 B4, whose content is entirely incorporated herewith by reference. In particular, the IDC terminal 110' according to an embodiment of the present invention corresponds to the electrical contact 1 described in DE 198 14 401 B4 and the two metal portions 111*a* and 111*b* correspond, respectively, to the first contact area 2 and the second contact area 3 described therein.

Figure 5:
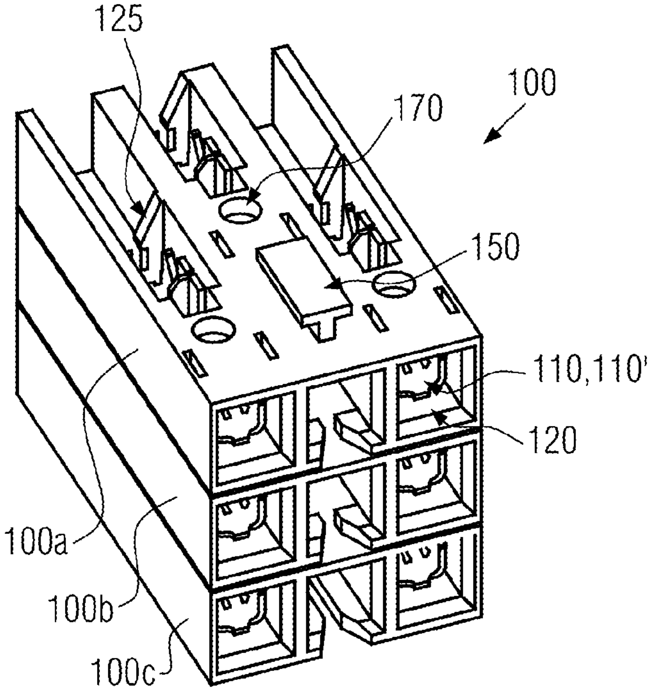
FIG. 5 is a perspective view of an IDC cluster according to an embodiment.

FIG. 5 schematically illustrates a three-dimensional view of an IDC cluster 100, according to an embodiment of the present invention. The IDC cluster 100 comprises a plurality of modular units 100*a*, 100*b*, 100*c* for housing a plurality of electrical terminals 110, 110' in corresponding electrical receptacles 120, for example IDC terminals. The IDC cluster 100 shown in FIG. 5 includes three modular units 100*a*, 100*b* and 100*c*, which are stacked on top of each other and fastened to one another by fixing the hooking elements 150 of a lower IDC cluster modular unit 100*a* into the fixing portion 160 of an upper IDC cluster modular unit 100*b*.

According to the invention, each IDC cluster modular unit 100*a* can be molded in a simple and fast way and it can be then fastened to a second IDC cluster modular unit 100*a* to form a modular structure without the need of complex, additional components. In this way, a plurality of receptacles 120 for accommodating corresponding IDC terminals 110, 110' can be produced and arranged in parallel rows in a simple and efficient way. The IDC terminals 110, 110' can be employed to terminate electrical wires by ID connection without preliminarily stripping the insulated wires. Any number of IDC cluster modular units 100*a* according to the present invention can be coupled to provide modularity. It is clear that, even if three modular units of the IDC cluster 100 are illustrated in FIG. 5, the IDC cluster 100 according to the present invention may comprise any number of modular units, for instance one, two, four, five or more.

Figure 6:
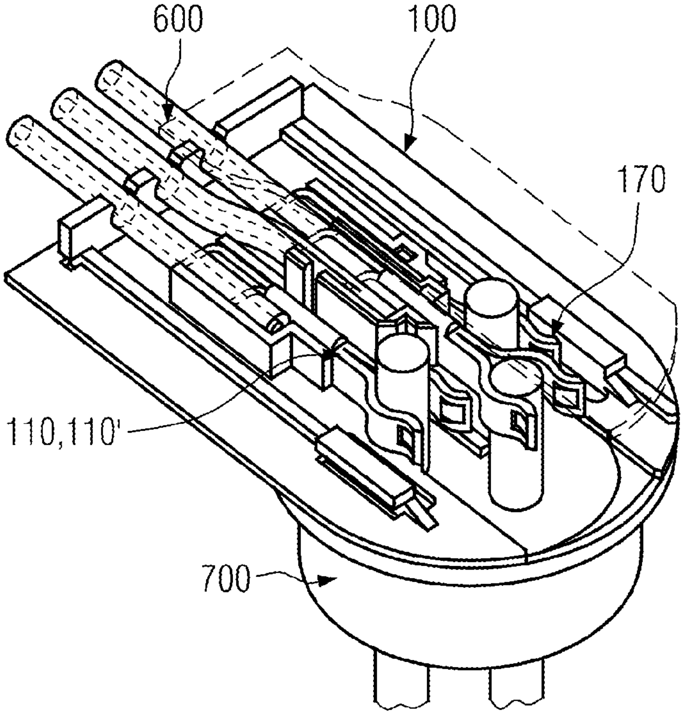
FIG. 6 is a perspective view of an IDC cluster module unit connected to a hermetic feedthrough of a compressor.

The IDC cluster 100 shown in FIG. 5 comprises a top surface and a bottom surface: the top surface corresponds to the second surface of the IDC cluster modular unit 100*a* and comprises plug inlets 170. The plug inlets 170 of a single IDC cluster modular unit 100*a*, 100*b*, 100*c* and/or the IDC cluster may 100 be connected to a hermetic feedthrough 700 of a compressor, for instance a Fusite hermetic feedthrough 700, as schematically shown in FIG. 6.

Figure 7:
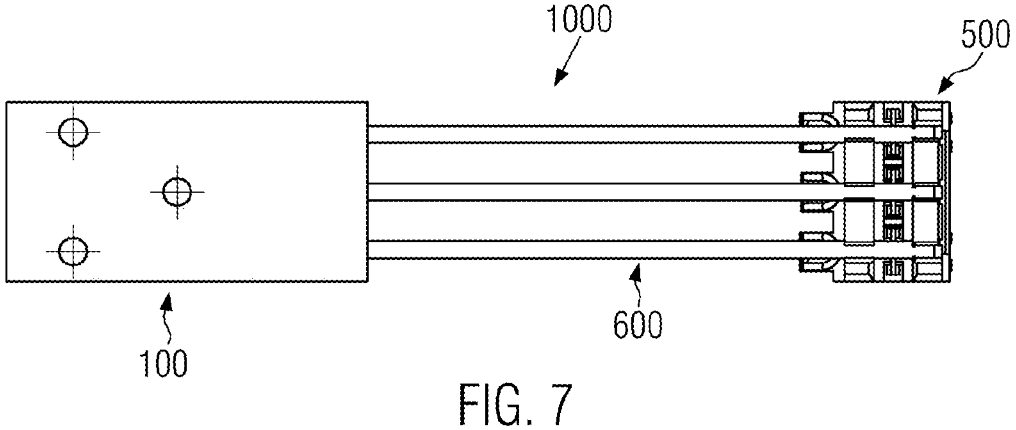
FIG. 7 is a top view of an IDC cluster assembly according to an embodiment.
Figure 8:
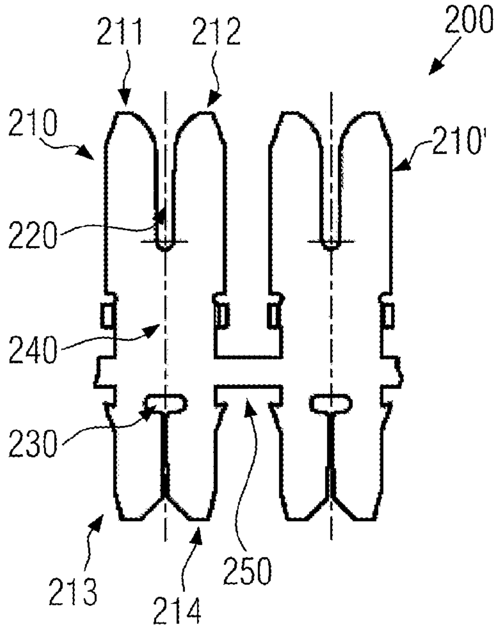
FIG. 8 is a top view of a dual electrical contact according to an embodiment.

FIG. 7 schematically illustrates a top view of an IDC cluster assembly 1000 comprising the IDC cluster 100, according to an embodiment of the present invention. In the embodiment shown in FIG. 7, the IDC cluster 100 is connected to an IDC connector 500 comprising a first cover 400 mated to a second cover 300, wherein the first cover 400 includes dual electrical contacts 200 for connecting magnet wires 610 and insulated wires 600. The IDC cluster 100 and the IDC connector 500 may be connected by electrical wires 600. Since the IDC cluster 100 is designed in such a way that the electrical wires 600 can be inserted into the corresponding cluster IDC terminals 110, 110' only from one side, the issue of reversing polarity at the time of wire installation is prevented. FIG. 8 schematically illustrates a front view of a dual electrical contact 200 which is positioned in the first cover 400, according to an embodiment of the present invention. The dual electrical contact 200 may be a Dual IDC Mag-Mate contact produced by the applicant.

The dual electrical contact 200 shown in FIG. 8 comprises a first insulation displacement member 210 and a second insulation displacement member 210', which are connected together by a bridge portion 250. However, the dual electrical contact 200 may also comprise a single insulation displacement member 210, without departing from the scope of protection of the invention. As the second insulation displacement member 210' is essentially a mirror image of the first insulation displacement member 210, only the first insulation displacement member 210 will be described in detail.

The first insulation displacement member 210 comprises a first (lower) terminal and a second (upper) terminal, which are spaced by a base portion 240. The first terminal includes arms 213 and 214 delimiting a contact slot 230 opening downwards. In a similar way, the second terminal includes arms 211 and 212 delimiting a contact slot opening downwards, which terminates at a substantially rounded opening 220. The first and second insulation displacement members 210 and 210' are connected together by the conductive bridge portion 250 extending from the base portions 240 and 240'.

The insulation displacement arms 211 and 212 define a wire-receiving slot 220, which is configured to receive one or more insulated electrical wires 600 (not shown in FIG. 8). When an electrical wire 600 is inserted therein and is moved towards the opening 220, its insulation case is cut and stripped and the electrical contact between the electrical wire 600 and the electrical contact can be established. In an embodiment, the wire-receiving slot 220 is configured to receive wires having a diameter between 1.4 mm and 1.6 mm.

Analogously, the insulation displacement arms 213 and 214 define a wire-receiving opening 230, which is configured to receive one or more magnet wires 610 (not shown in FIG. 8). The distance between the two arms 213 and 214 progressively decrease from the end portion towards the opening 230. In this way, when a magnet wire 610 is inserted therein and is moved towards the opening 230, the electrical contact can be established.

Figure 9:
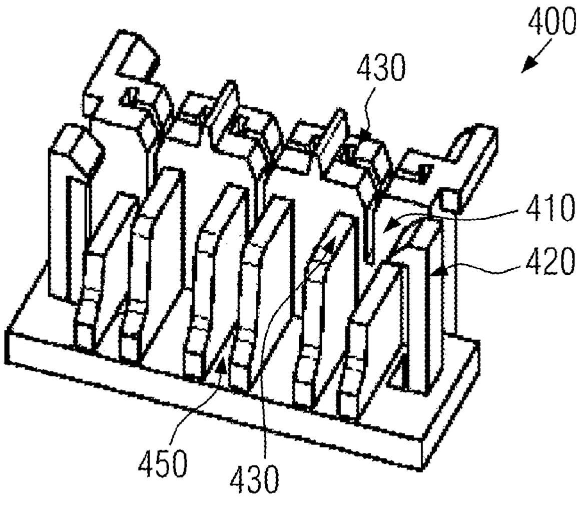
FIG. 9 is a perspective view of a first cover according to an embodiment.

A plurality of dual electrical contacts 200 may be positioned within a first cover 400 according to the present invention, which is schematically illustrated in FIG. 9. In an embodiment, the electrical contact element 200 is vertically inserted into the corresponding housing 410 of the first cover 400, in such a way that the lower terminal is accommodated inside the housing 410 and hosts a magnet wire 610, and the upper terminal protrudes from the housing 410 and is free to be connected to an electrical wire 600.

The first cover 400 comprises latching portions 420 and support portions 430 for coupling it to a corresponding second cover 300. The first cover 400 further comprises wire inlets 450 for the insertion of magnet wires 610.

Figure 10:
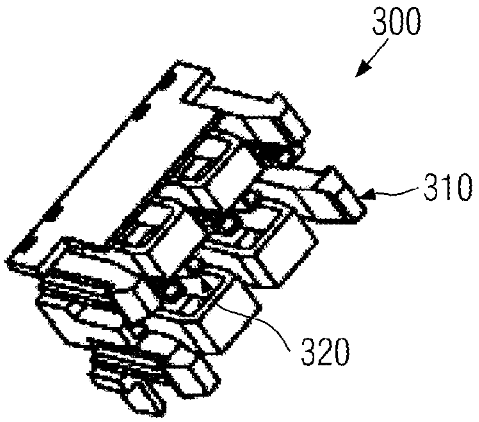
FIG. 10 is a perspective view of a second cover matable with the first cover.

FIG. 10 schematically illustrates a second cover 300 to be mated to the first cover 400, according to an embodiment of the present invention. The second cover 300 comprises latching portions 310 to be engaged with the corresponding latching portions 420 of the first cover 400 to fix the relative position between the two elements. The second cover 300 further comprises wire-receiving passages 320 for accommodating the electrical wires 600 connected to the IDC cluster 100 and guiding them into the wire-receiving slots 220 of the electrical contact element 200.

The process for assembling the IDC connector 500 comprising the first cover 400 and the second cover 300, according to an embodiment of the present invention, will be described with reference to FIGS. 11 to 14.

Figure 11:
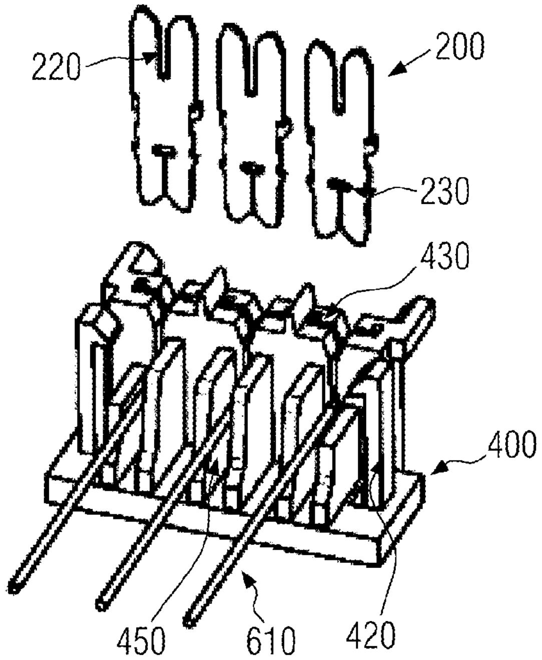
FIG. 11 is a perspective view of a first step of assembling an IDC connector according to an embodiment.

FIG. 11 illustrates a first assembling step, wherein the magnet wires 610 are pre-assembled with the first cover 400 and are accommodated within the corresponding wire inlets 450. For instance, the first cover 400 may be designed as part of a bobbin: the magnet wires 610 may form the coil winding and may be then fed in the first cover 400, where they are terminated by the dual electrical contacts 200. The dual electrical contacts 200 are inserted into the housings 410 of the first cover 400. In this way, the magnet wires 610 are positioned within the contact slot opening 230 and the electrical connection between the wires 610 and the dual electrical contacts 200 is established.

Figure 12:
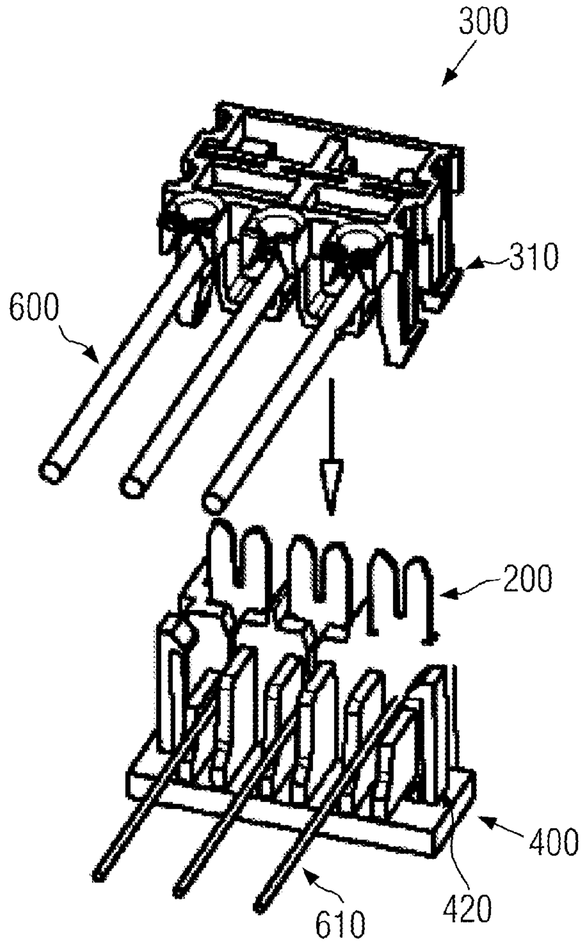
FIG. 12 is a perspective view of a further step of assembling the IDC connector.
Figure 13:
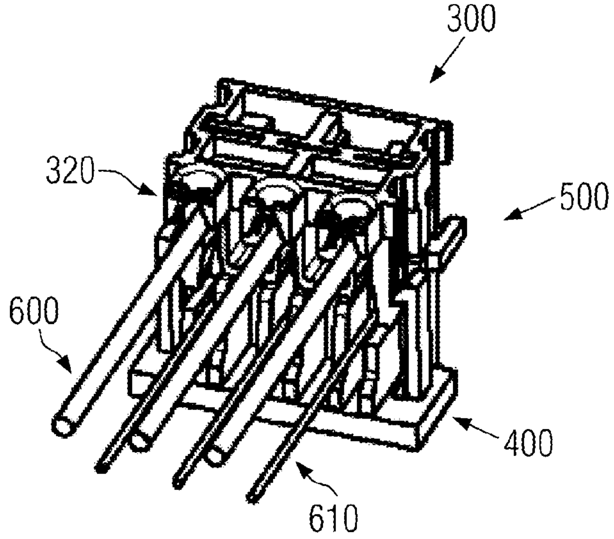
FIG. 13 is a perspective view of a further step of assembling the IDC connector.

FIG. 12 illustrates a further step in the assembling process, wherein the second cover 300, comprising electrical wires 600, is positioned onto the support portion 430 of the first cover 400. An end of a plurality of electrical wires 600 is inserted into the wire-receiving passages 320 of the second cover 300 and is guided into the contact slot 220 of the dual electrical contact 200. In this way, a preliminary connection between the electrical wires 600 and the magnet wires 610 is established. In an embodiment, the other end of the electrical wires 600 may be terminated in the IDC cluster terminals 110, 110'. As shown in FIG. 13, the second cover 300 may be secured to the first cover 400 by engaging the latching portions 310 with the complementary latching portions 420. The IDC connector 500 is thus assembled.

The IDC cluster 100 is connected to the IDC connector 500 by connecting the electrical wires 600 to the second cover 300 in such a way that, when the second cover 300 is coupled to the first cover 400, the electrical wires 600 fitted into the corresponding wire-receiving passages 320 are simultaneously received into the corresponding electrical wire-receiving slots 220 of the one or more dual electrical contacts and electrically connected to the magnet wires 610.

Figure 14:
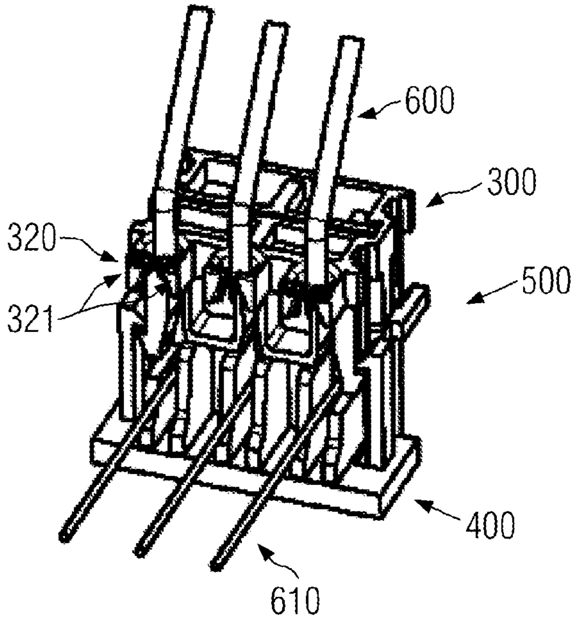
FIG. 14 is a perspective view of the assembled IDC connector.

As a final step, shown in FIG. 14, the electrical wires 600 may be bent by 90°, so that their longitudinal axis is perpendicular to the longitudinal axis of the wires 610. The electrical wires 600, after bending, are kept in the orthogonal position with respect to the wires 610 by the two projecting flaps 321 of the wire-receiving passage 320. The two projecting flaps 321 are rigid elements protruding from two opposite sides of the wire-receiving passage 320 and they prevent the electrical wire 600 accommodated thereon from returning to the horizontal position. In this way, the position of the electrical wires 600 within the terminals is fixed and the connection is secured.

The electrical cables 600 can connect the IDC cluster 100*a* to different electrical components, for instance power supplies, motors, compressors or sensors.

The IDC connector 500 may be assembled with the IDC cluster 100 to form an IDC cluster assembly 1000 (shown in FIG. 7) which is largely employed in air-conditioner compressors, refrigeration compressors, automotive air compressors and motors.

The IDC cluster assembly 1000 according to the embodiment illustrated in FIG. 7 may be assembled by a fully automated harness assembly machine. The machine inserts, in one stroke, one (right) side of the three electrical wires 600 in the second cover 300; at the same time, the machine terminates the other (left) end of the three electrical wires 600 in the IDC cluster terminals 110, 110'. In an embodiment, an intermediate assembly, comprising the IDC cluster 100 connected to the second cover 300 of the IDC connector 500 by electrical wires 600, may be initially formed.

The first cover 400 may be designed as part of a bobbin, for instance the bobbin of a stator, and terminates one ends of a plurality of magnet wires 610 wound in a coil. As a final step, the second cover 300 is assembled to the first cover 400 integrated with the bobbin and fixed by the latches 310, as described above and as shown in FIGS. 12 to 14.

The IDC cluster 100 may be, for instance, connected to a hermetic feedthrough 700 of a compressor through the inlets 170. The IDC cluster 100 may be also connected to other electrical devices, such as temperature sensors. In fact, thanks to its modularity, the IDC cluster 100 comprises several IDC terminals which can provide a quick connection (i.e. a solderless connection) to the cables of several electrical devices.

Figure 15:
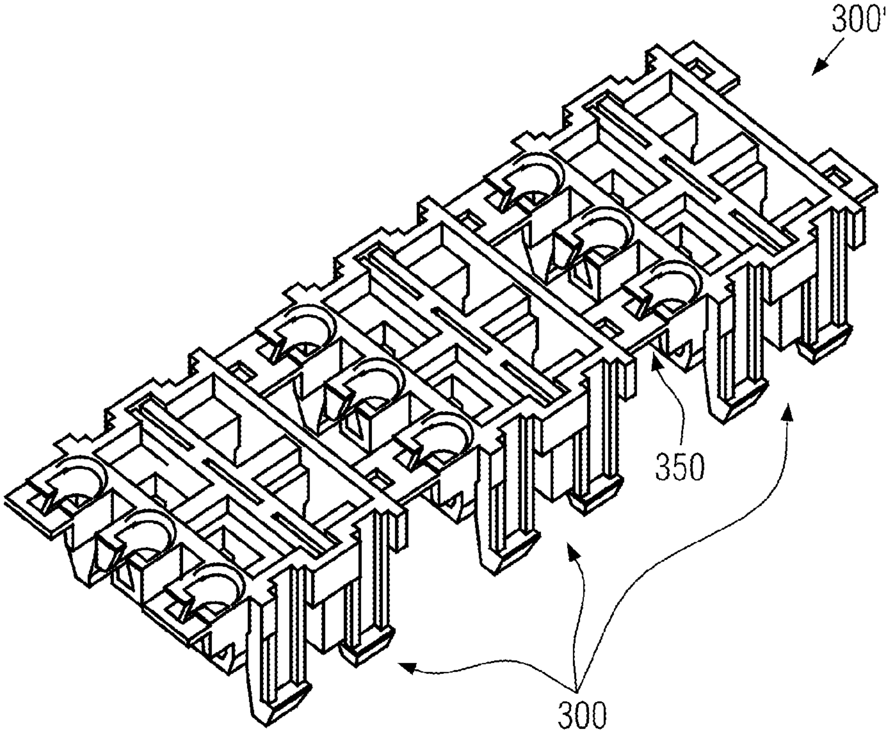
FIG. 15 is a perspective view of a step of production of the second cover according to an embodiment.

FIG. 15 schematically illustrates the production process of the second covers 300. The second covers 300 may be molded in a continuous process in a reel, so as to produce a chained second cover 300' comprising a plurality of second covers 300 connected together by junction elements 350. It is clear that, even if three second covers 300 are illustrated in FIG. 15, any number of second covers 300 may be connected, for instance two, four, five or more. After production, the chained second covers 300' are fed into the machine for forming the IDC cluster assemblies 1000. They are first precisely positioned for receiving the electrical wires 600 and they are cut and separated from one another only before wire insertion. Finally, they are assembled with the first covers 400.

Therefore, the present invention provides a modular unit **100*a* that can provide IDC termination of an electrically insulated wire 600** and that can be connected to other IDC connectors to provide a low-cost and efficient IDC connector assembly for compressors and motors. This concept lowers cost by a fully-automated process by reducing the cycle time to produce the compressor motor harness, while at the same time the quality will be improved due to the fact that all contacts and housings are supplied in a chain/reel which supports an endless feed-in in a precise positioned orientation.

According to a further embodiment of the present invention, a kit of components is provided, the kit comprising: an IDC cluster modular unit **100*a* or an IDC cluster such as the ones described above, and an IDC connector 500 as described above. The IDC connector 500 is connectable to the IDC cluster 100*a* by one or more electrical wires 600**.

The IDC cluster assembly 1000 may be used for electrically connecting sealed header pins on compressors, for instance air conditioner compressors, refrigeration compressors, automotive air compressors. It may be used, for instance, to connect the magnet wires of a bobbin of a compressor motor to other electrical devices in a simple and secure way. The IDC cluster assembly 1000 has a high resistance to shock and abuse, and long-life performance in presence of oils and refrigerants.

According to a further embodiment of the present invention, a motor for an air compressor comprising an IDC cluster assembly 1000 as the ones described above is provided, wherein the one or more magnet wires are the magnet wires of that motor. This configuration is advantageous because the IDC cluster assembly 1000 has a high resistance to shock and abuse, and long-life performance in the presence of oils and refrigerants, therefore it can be advantageously employed in air-conditioner compressors, refrigeration compressors and automotive air compressors.

According to a further embodiment of the present invention, a hermetic plug assembly comprising a hermetic feedthrough 700 of a compressor as described above and one or more IDC cluster modular units **100*a* as described above is provided, wherein the second surface of the one or more IDC cluster modular units 100*a* comprises one or more inlets 170 for connecting it to the hermetic feedthrough 700** of a compressor. The advantage of this configuration is that a low-cost, fully insulated and solderless connection is provided for electrically connecting the hermetic header pins of a compressor.

While the invention has been described with respect to certain physical embodiments constructed in accordance therewith, it will be apparent to those skilled in the art that various modifications, variations and improvements of the present invention may be made in light of the above teachings and within the purview of the appended claims without departing from the spirit and intended scope of the invention.

In addition, those areas in which it is believed that those of ordinary skill in the art are familiar have not been described herein in order not to unnecessarily obscure the invention described. For example, the operation of an insulation displacement connector is not described in detail because they are considered to be known to the skilled person.

Accordingly, it has to be understood that the invention is not to be limited by the specific illustrative embodiments, but only by the scope of the appended claims.

What is claimed is:

1. An insulation displacement contact (IDC) cluster, comprising:

a plurality of IDC cluster modular units each having a plurality of receptacles adjacent to one another in a row, each of the receptacles receives an IDC terminal, a first IDC cluster modular unit of the IDC cluster modular units is coupled to a second IDC cluster modular unit of the IDC cluster modular units to form a modular structure by stacking and fastening together, arranging the receptacles of the IDC cluster modular units in parallel rows, each of the receptacles has a holding device keeping an electrical wire in a connection position within the IDC terminal.

2. The IDC cluster of claim 1, wherein each of the IDC cluster modular units has a first surface and a second surface opposite to the first surface, the first surface of the first IDC cluster modular unit is mated to the second surface of the second IDC cluster modular unit when the IDC cluster modular units are stacked on top of each other.

3. The IDC cluster of claim 2, wherein the first surface has a hooking element and the second surface has a fixing portion, the hooking element of the first IDC cluster modular unit is fixed to the fixing portion of the second IDC cluster modular unit to fasten IDC cluster modular units together.

4. The IDC cluster of claim 1, wherein the IDC terminal has a crimp device keeping the electrical wire in a connection position within the IDC terminal.

5. The IDC cluster of claim 4, wherein the crimp device includes a plurality of wire-retention flaps that can be compressed onto the electrical wire.

6. The IDC cluster of claim 2, wherein the second surface has an inlet for an input plug.

7. The IDC cluster of claim 6, wherein a hermetic feedthrough of a compressor is connected to the inlet.

8. An IDC cluster assembly, comprising:

an IDC cluster including a plurality of IDC cluster modular units each having a plurality of receptacles adjacent to one another in a row, each of the receptacles receives an IDC terminal, a first IDC cluster modular unit of the IDC cluster modular units is coupled to a second IDC cluster modular unit of the IDC cluster modular units to form a modular structure by stacking and fastening together, arranging the receptacles of the IDC cluster modular units in parallel rows; and an IDC connector including a first cover, a dual electrical contact fit into the first cover, and a second cover closing the first cover, the dual electrical contact has a magnet wire-receiving opening and an electrical wire-receiving slot, the first cover receives a magnet wire, the second cover has a wire-receiving passage receiving an electrical wire, the IDC connector is connected to the IDC cluster by the electrical wire.

9. The IDC cluster assembly of claim 8, wherein the IDC cluster is connected to the IDC connector by connecting the electrical wire to the second cover and, when the second cover is coupled to the first cover, the electrical wire in the wire-receiving passage is received in one of the electrical wire-receiving slots and electrically connected to the magnet wire.

10. The IDC cluster assembly of claim 8, wherein the magnet wire is accommodated in the magnet-wire receiving opening.

11. The IDC cluster assembly of claim 8, wherein the dual electrical contact is one of a pair of adjacent dual electrical contacts connected by a conductive bridge portion.

12. The IDC cluster assembly of claim 11, wherein the magnet wire is one of a plurality of magnet wires, and an electrical connection between a pair of adjacent magnet wires is established by the dual electrical contact with the conductive bridge portion.

13. The IDC cluster assembly of claim 8, wherein the second cover has a plurality of second latching portions engages with a plurality of first latching portions of the first cover.

14. The IDC cluster assembly of claim 8, wherein the IDC cluster assembly is part of a motor for an air compressor and the magnet wire is a magnet wire of the motor.

15. A method of producing a modular IDC cluster, comprising:

providing a plurality of IDC cluster modular units each having a plurality of receptacles adjacent to one another in a row, each of the receptacles receives an IDC terminal, each of the IDC cluster modular units has a first surface and a second surface opposite to the first surface, each of the receptacles has a holding device keeping one of a plurality of electrical wires in a connection position within the IDC terminal;

stacking the IDC cluster modular units on top of each other with the first surface of one of a first IDC cluster modular unit facing a second surface of a second IDC cluster modular unit; and fastening the first IDC cluster modular unit to the second IDC cluster modular unit to form an IDC cluster.

16. The method of claim 15, wherein the first surface has a hooking element and the second surface has a fixing portion, and the fastening step includes fixing the hooking element of the first IDC cluster modular unit to the fixing portion of the second IDC cluster modular unit to fasten IDC cluster modular units together.

17. The method of claim 15, further comprising:

providing an IDC connector including a first cover and a second cover;

connecting a plurality of magnet wires to a plurality of magnet wire-receiving openings of a plurality of dual electrical contacts accommodated in the first cover; and accommodating a plurality of first ends of the plurality of electrical wires into a corresponding plurality of wire-receiving passages arranged in the second cover.

18. The method of claim 17, further comprising placing the second cover onto the first cover to close the first cover, the first ends of the electrical wires are simultaneously accommodated into a plurality of wire-receiving slots of the dual electrical contacts and the electrical wires are electrically connected to the magnet wires.

19. The method of claim 18, further comprising connecting a plurality of second ends of the electrical wires to the DC cluster, the second ends are simultaneously connected to the DC terminals while the first ends are accommodated in the second cover.

* * * * *